US012152799B2

(12) United States Patent
Kitagawa et al.

(10) Patent No.: US 12,152,799 B2
(45) Date of Patent: Nov. 26, 2024

(54) CONTAMINATION INFORMATION ESTIMATION SYSTEM AND AIR TREATMENT DEVICE

(71) Applicant: DAIKIN INDUSTRIES, LTD., Osaka (JP)

(72) Inventors: Keita Kitagawa, Osaka (JP); Youichi Handa, Osaka (JP); Yoshiteru Nouchi, Osaka (JP); Masaya Nishimura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 342 days.

(21) Appl. No.: 17/459,811

(22) Filed: Aug. 27, 2021

(65) Prior Publication Data

US 2021/0389015 A1    Dec. 16, 2021

Related U.S. Application Data

(63) Continuation of application No. PCT/JP2019/047459, filed on Dec. 4, 2019.

(30) Foreign Application Priority Data

Feb. 27, 2019 (JP) .................................. 2019-034591

(51) Int. Cl.
  *F24F 11/873* (2018.01)
  *F24F 11/39* (2018.01)
  *F24F 11/49* (2018.01)

(52) U.S. Cl.
  CPC ............ *F24F 11/873* (2018.01); *F24F 11/39* (2018.01); *F24F 11/49* (2018.01)

(58) Field of Classification Search
  None
  See application file for complete search history.

(56) References Cited

U.S. PATENT DOCUMENTS

| | | | | |
|---|---|---|---|---|
| 2016/0146487 A1* | 5/2016 | Zywiak | .................... | F24F 11/62 374/45 |
| 2019/0373250 A1* | 12/2019 | Kim | ....................... | H04N 23/60 |

(Continued)

FOREIGN PATENT DOCUMENTS

| | | | |
|---|---|---|---|
| CN | 107818560 A | | 3/2018 |
| CN | 108053390 A | * | 5/2018 |

(Continued)

OTHER PUBLICATIONS

English translation of the International Preliminary Report on Patentability and Written Opinion of the International Searching Authority for International Application No. PCT/JP2019/047459, dated Sep. 10, 2021.

(Continued)

*Primary Examiner* — Santosh R Poudel
(74) *Attorney, Agent, or Firm* — Birch, Stewart, Kolasch & Birch, LLP

(57) ABSTRACT

A contamination information estimation system includes a camera that captures an image of a drain pan in a casing of an air conditioner, and an estimator that estimates contamination information related to contamination on the drain pan on the basis of image data captured by the camera and operation data of the air conditioner and/or environment data related to an environment in which the air conditioner is provided.

8 Claims, 6 Drawing Sheets

(56) References Cited

U.S. PATENT DOCUMENTS

2020/0400325 A1\* 12/2020 Yano ................... G05B 19/042
2021/0190357 A1\* 6/2021 Ishizaka .................. F24F 11/89

FOREIGN PATENT DOCUMENTS

| CN | 108253587 | A | \* | 7/2018 | |
|----|-----------|---|---|--------|--|
| CN | 109358546 | A | \* | 2/2019 | ........... G05B 19/042 |
| EP | 3 572 255 | A1 | | 11/2019 | |
| FR | 3 985 789 | A1 | | 11/2018 | |
| JP | 8-224425 | A | | 9/1996 | |
| JP | 2002-7550 | A | | 1/2002 | |
| JP | 2004-291899 | A | | 10/2004 | |
| JP | 2005-180830 | A | | 7/2005 | |
| JP | 2005-292066 | A | | 10/2005 | |
| JP | 2007046864 | A | \* | 2/2007 | |
| JP | 2007-255840 | A | | 10/2007 | |
| JP | 2018069225 | A | \* | 5/2018 | |
| JP | 2018-114948 | A | | 7/2018 | |
| JP | 2018-179446 | A | | 11/2018 | |

OTHER PUBLICATIONS

Extended European Search Report for European Application No. 19917267.7, dated Apr. 14, 2022.
English translation of Chinese Office Action for Chinese Application No. 201980093123.5, dated May 6, 2022.
Ishiyu, "Causes and Countermeasures for Indoor Air Condensation in Air-Conditioned Spaces", Oil Process Construction, May 2009, pp. 232-234.
International Search Report for PCT/JP2019/047459 (PCT/ISA/210) mailed on Feb. 10, 2020.

\* cited by examiner

CONTAMINATION INFORMATION ESTIMATION SYSTEM AND AIR TREATMENT DEVICE

CROSS REFERENCE TO RELATED APPLICATIONS

This application is a Continuation of PCT International Application No. PCT/JP2019/047459, filed on Dec. 4, 2019, which claims priority under 35 U.S.C. 119 (a) to Patent Application No. 2019-034591, filed in Japan on Feb. 27, 2019, all of which are hereby expressly incorporated by reference into the present application.

TECHNICAL FIELD

The present disclosure relates to a contamination information estimation system and an air treatment device.

BACKGROUND ART

An air treatment device such as an air conditioner or an air purifier includes a component that is gradually contaminated as the air treatment device operates. Patent Literature 1 discloses a technique of diagnosing a state of the component.

CITATION LIST

Patent Literature

Patent Literature 1: JP 2005-292066 A

SUMMARY

A first aspect of the present disclosure is a contamination information estimation system including an imaging unit (72) configured to capture an image of a component in a casing (20) of an air treatment device (10), and an estimator (81) configured to estimate contamination information related to contamination on the component based on image data captured by the imaging unit (72) and operation data of the air treatment device (10) and/or environment data related to an environment in which the air treatment device (10) is provided.

DESCRIPTION OF EMBODIMENTS

Figure 1:
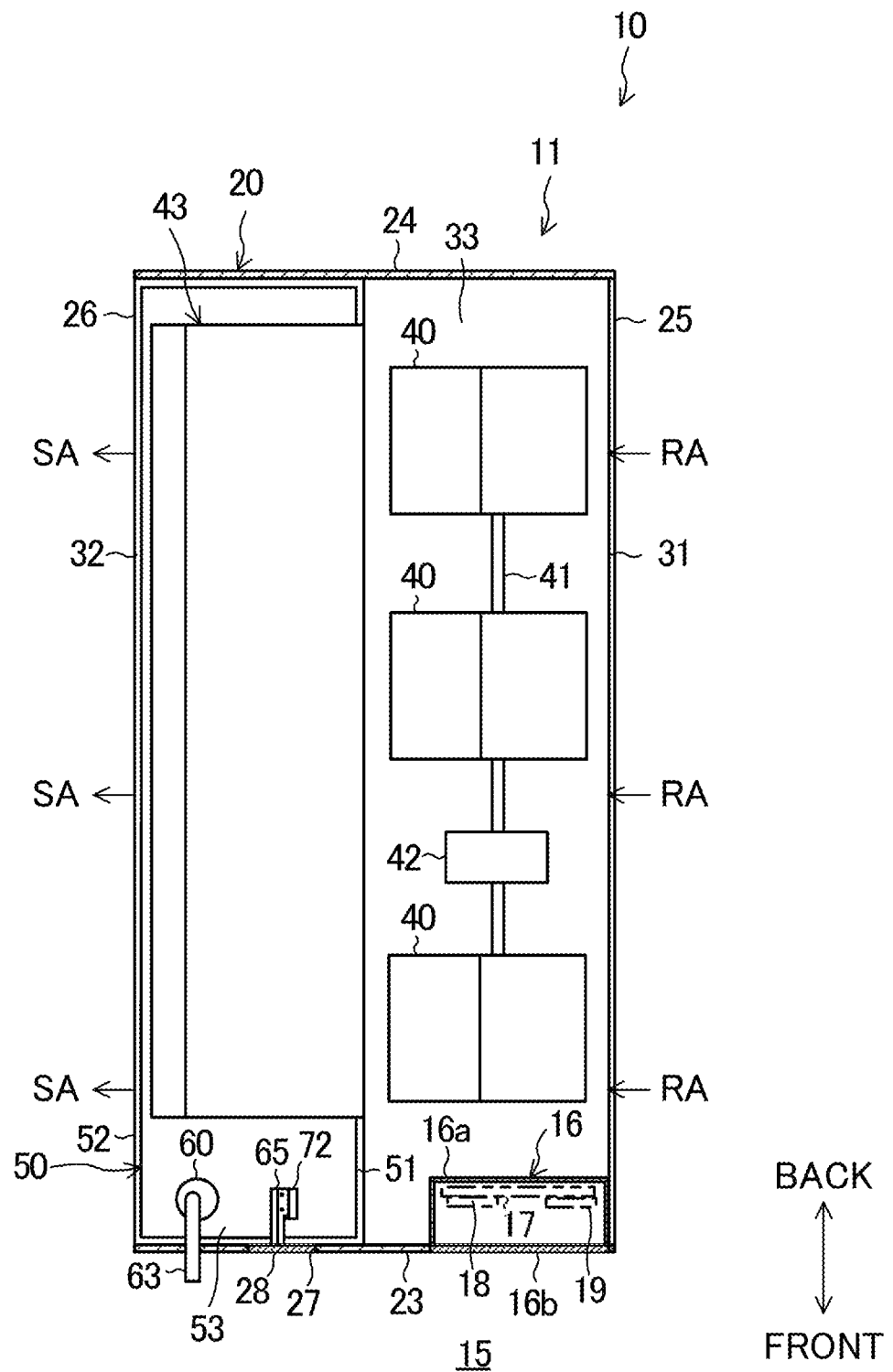
FIG. 1 is a plan view illustrating an internal structure of an air conditioner.
Figure 2:
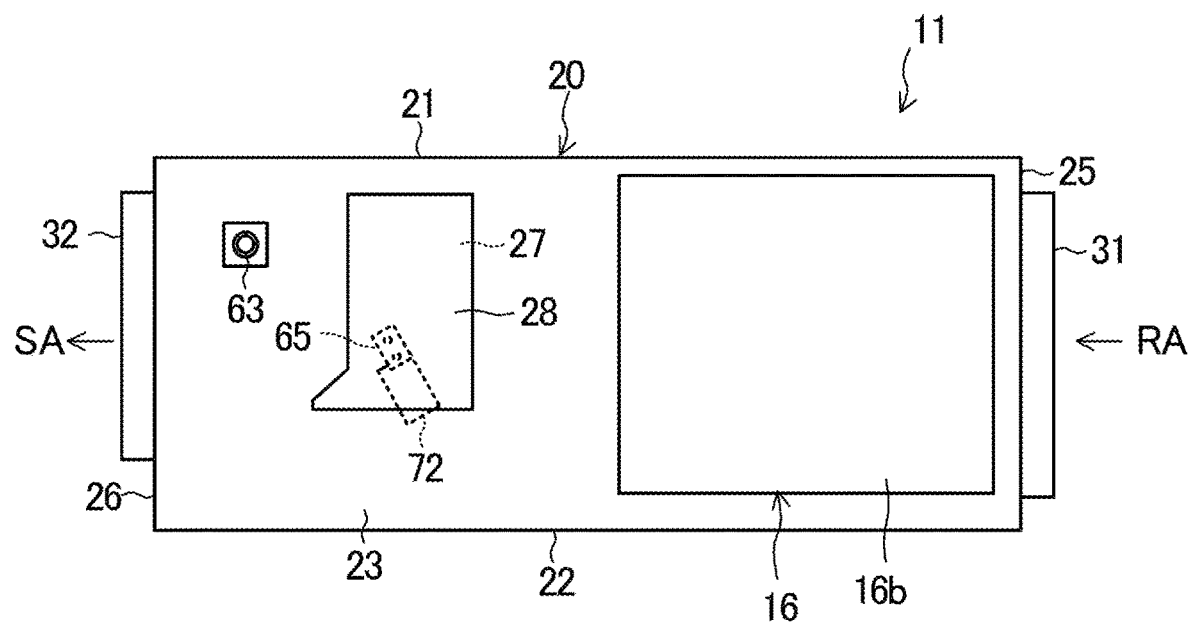
FIG. 2 is a front view of the air conditioner.

Hereinafter, an embodiment of the present disclosure will be described below with reference to the drawings. The following embodiment is essentially preferred exemplification, and is not intended to restrict the scope of the present invention, matters to which the present invention is applicable, or usage of the present invention.

Embodiment

An air treatment device according to the present embodiment is an air conditioner (10) that adjusts at least a temperature in a room. An air conditioner (10) in FIG. 1 adjusts a temperature of air (RA), and supplies the temperature-adjusted air to a room as supply air (SA). The air conditioner (10) performs a cooling operation and a heating operation.

The air conditioner (10) includes an indoor unit (11). The indoor unit (11) is installed in a space in an attic. The indoor unit (11) is connected to an outdoor unit via a refrigerant pipe. This connection forms a refrigerant circuit in the air conditioner (10). The outdoor unit is not shown in the drawings.

In the refrigerant circuit, a refrigerant circulates to achieve a vapor compression refrigeration cycle. In the refrigerant circuit, a compressor, an outdoor heat exchanger, an expansion valve, and an indoor heat exchanger (43) are connected. In the refrigerant circuit, a first refrigeration cycle and a second refrigeration cycle are switched.

The first refrigeration cycle is performed during the cooling operation. The first refrigeration cycle is a cooling cycle in which the outdoor heat exchanger serves as a radiator or a condenser and the indoor heat exchanger (43) serves as an evaporator. The second refrigeration cycle is performed during heating operation. The second refrigeration cycle is a heating cycle in which the indoor heat exchanger (43) serves as a radiator or a condenser and the outdoor heat exchanger serves as an evaporator.

<Configuration of Indoor Unit>

A configuration of the indoor unit (11) will be described with reference to FIGS. 1 to 4. The indoor unit (11) includes a casing (20), a fan (40), an indoor heat exchanger (43), a drain pan (50), and a drain pump (60). The casing (20) is installed in the attic. The fan (40), the indoor heat exchanger (43), the drain pan (50), and the drain pump (60) are disposed in the casing (20).

The fan (40), the indoor heat exchanger (43), the drain pan (50), and the drain pump (60) are components of the air conditioner (10).

Casing

The casing (20) has a rectangular parallelepiped hollow box shape. The casing (20) includes a top panel (21), a bottom plate (22), a front panel (23), a rear plate (24), a first side plate (25), and a second side plate (26). The front panel (23) and the rear plate (24) face each other. The first side plate (25) and the second side plate (26) face each other.

The front panel (23) faces a maintenance space (15). The maintenance space (15) is a work space for a service provider. The front panel (23) has an inspection port (27). An inspection lid (28) is detachably attached to the inspection port (27). The drain pan (50) is disposed inside the inspection port (27). The inspection port (27) and the drain pan (50) overlap each other as viewed in a thickness direction of the front panel (23). The service provider can visually recognize the drain pan (50) through the inspection port (27).

The first side plate (25) has a suction port (31). A filter (not shown) is provided near the suction port (31) in the casing (20). A suction duct is connected to the suction port (31). An inlet end of the suction duct is connected to an indoor space. The second side plate (26) has a blow-out port (32). A blow-out duct is connected to the blow-out port (32). An outlet end of the blow-out duct is connected to indoor air. In the casing (20), an air flow path (33) is formed between the suction port (31) and the blow-out port (32). The suction duct and the blow-out duct are not shown in the drawings.

Fan

The fan (40) is disposed closer to the first side plate (25) in the air flow path (33). FIG. 1 illustrates an example in which three fans (40) are disposed in the air flow path (33).

In the present embodiment, an example in which the fans (40) are sirocco fans is illustrated. The three fans (40) are connected to each other by a shaft (41), and are driven by one motor (42).

Indoor Heat Exchanger

Figure 3:
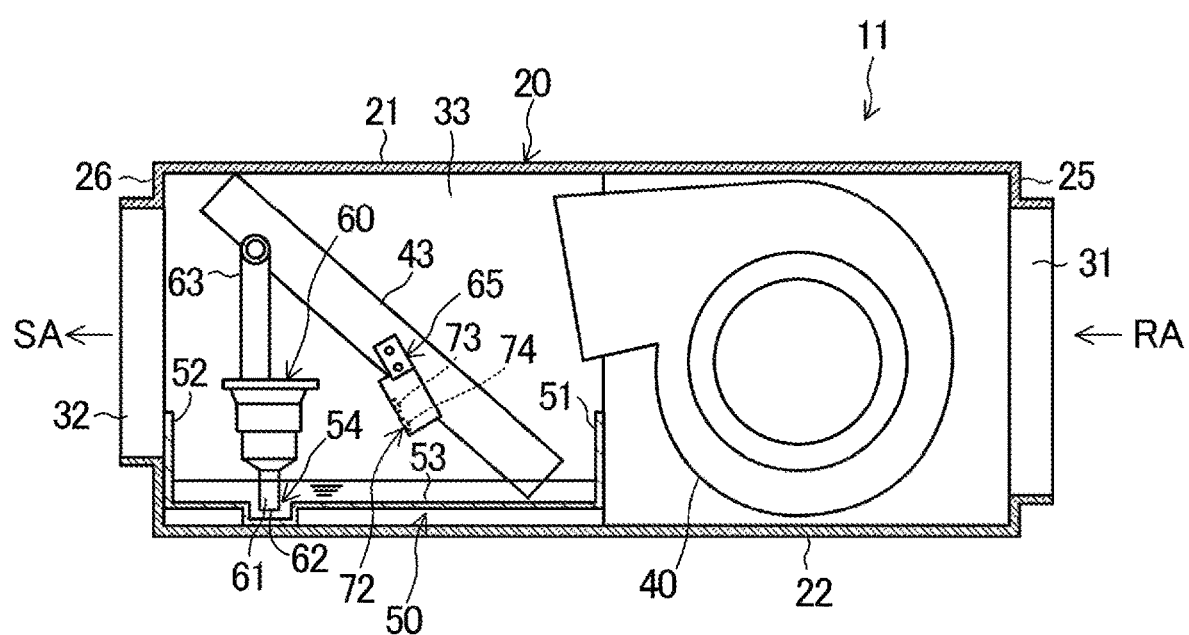
FIG. 3 is a longitudinal sectional view illustrating the internal structure of the air conditioner.
Figure 4:
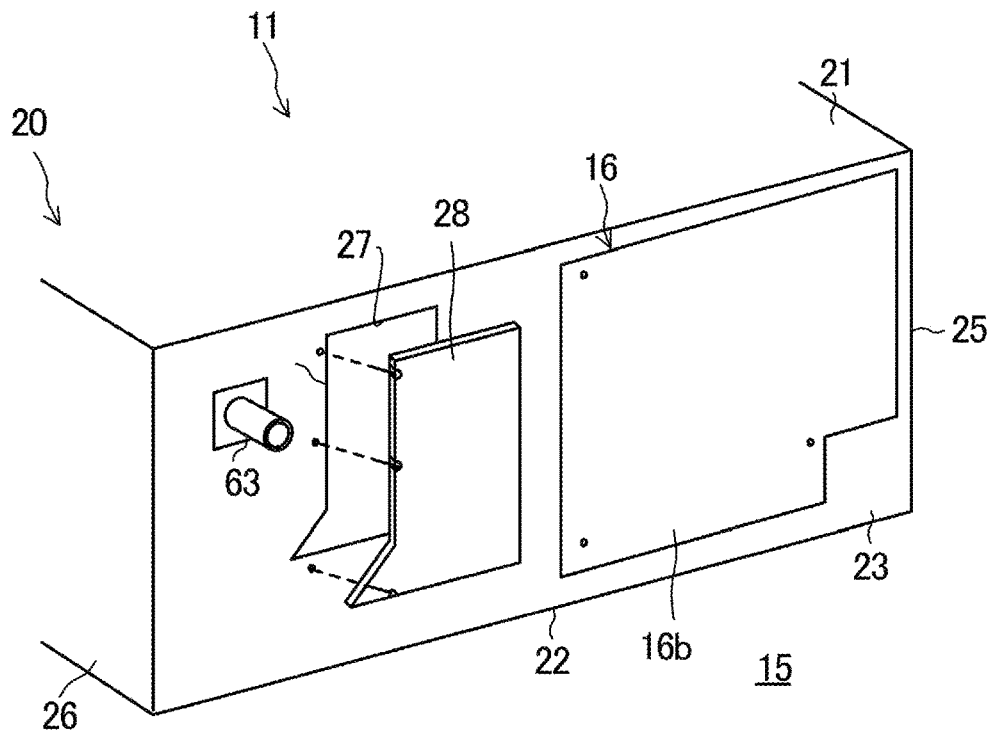
FIG. 4 is a perspective view illustrating a schematic configuration of the air conditioner in a front view.

The indoor heat exchanger (43) is disposed closer to the second side plate (26) in the air flow path (33). In the present embodiment, an example in which the indoor heat exchanger (43) is a fin-and-tube heat exchanger is illustrated. In FIG. 3, the indoor heat exchanger (43) is disposed obliquely with respect to a vertical direction.

The indoor heat exchanger (43) in the first refrigeration cycle cools the air. At this time, moisture in the air is condensed to generate condensed water.

The indoor heat exchanger (43) in the second refrigeration cycle heats the air.

Drain Pan

The drain pan (50) is disposed on a bottom plate (22) in the casing (20). The drain pan (50) is disposed in the air flow path (33). The drain pan (50) is disposed below the indoor heat exchanger (43). The drain pan (50) is a tray that receives water. Specifically, the drain pan (50) receives condensed water generated near the indoor heat exchanger (43).

The drain pan (50) has a first side wall (51), a second side wall (52), and a bottom (53). In the air flow path (33), the first side wall (51) is located upstream in an air flow of the indoor heat exchanger (43). In the air flow path (33), the second side wall (52) is located downstream in the air flow of the indoor heat exchanger (43). The bottom (53) is formed across the first side wall (51) and the second side wall (52). The bottom (53) has a concave portion (54). A bottom surface of the concave portion (54) is a lowest part in a height direction of the drain pan (50).

The drain pan (50) includes a resin material or a metal. A surface color of at least the bottom (53) of the drain pan (50) is a relatively light color such as white or beige. In other words, at least the bottom (53) of the drain pan (50) has a color of relatively high brightness.

Drain Pump

The drain pump (60) is disposed in the drain pan (50). The drain pump (60) is a pump that discharges the water in the drain pan (50). A suction portion (61) that sucks water is provided at a lower part of the drain pump (60). The drain pump (60) is disposed such that the suction portion (61) is disposed in the concave portion (54) of the drain pan (50).

A flow port (62) into which the water flows is formed at a lower end of the suction portion (61). The flow port (62) opens toward the bottom surface of the concave portion (54).

A discharge pipe (63) is connected to an upper part of the drain pump (60). The discharge pipe (63) is connected to a discharge side of the drain pump (60). The discharge pipe (63) penetrates an upper part of the front panel (23) of the casing (20) in the thickness direction of the front panel (23).

When the drain pump (60) is operated, water accumulated in the drain pan is sucked into the suction portion (61) of the drain pump (60). The sucked water is discharged from the drain pump (60). The discharged water is discharged to the outside of the casing (20) through the discharge pipe (63).

Electric Component Box

As illustrated in FIG. 1, the indoor unit (11) includes an electric component box (16).

The electric component box (16) is disposed near the front panel (23) and the fan (40). A printed board (17) is accommodated in the electric component box (16). A control unit (18), a storage unit (19), and a power source unit are mounted on the printed board (17).

The control unit (18) includes a microcomputer including a CPU and a memory. The control unit (18) controls driving of the components of the air conditioner (10) and operation of the air conditioner (10).

The storage unit (19) includes a semiconductor memory. The storage unit (19) stores log data related to driving and control of the components of the air conditioner (10) and log data related to the operation of the air conditioner (10). The storage unit (19) also stores data indicating an installation location of the air conditioner (10). The data indicating the installation location of the air conditioner (10) is input by a service provider or the like via a remote controller or the like of the air conditioner (10) when the air conditioner (10) is installed.

The power source unit generates a power source for supplying power to a component that requires power for driving among the components constituting the air conditioner (10).

The electric component box (16) includes a box body (16a) whose front side is opened, and an electric component lid (16b) that opens and closes an opening surface of the box body (16a). The electric component lid (16b) constitutes a part of the front panel (23). By removing the electric component lid (16b), an inner side of the electric component box (16) is exposed to the maintenance space (15).

Although not shown in the drawings, the air conditioner (10) is provided with a suction air sensor, an air quality sensor, a heat exchange sensor, a pipe temperature sensor, and a drain pan sensor. The control unit (18) is connected to these sensors. Detection results of the sensors are input to the control unit (18). The detection results of the sensors are used in various control operations by the control unit (18).

The suction air sensor is provided near the suction port (31), and detects the temperature and humidity of the air (RA) sucked into the casing (20). The air quality sensor is provided in the casing (20) and near the suction port (31), and detects an air quality of the air (RA) sucked into the casing (20) through the filter (not shown). The air quality includes an amount of particulate contained in the air (RA) and volatile organic compounds (VOC).

The heat exchange sensor is provided on a surface of the indoor heat exchanger (43), and detects a temperature of the indoor heat exchanger (43). The pipe temperature sensor is provided near at least one of a liquid pipe or a gas pipe of the refrigerant circuit, and detects a temperature of a corresponding pipe. The drain pan sensor is provided in the drain pan (50), and detects a water level and a temperature in the drain pan (50).

Stay

Figure 5:
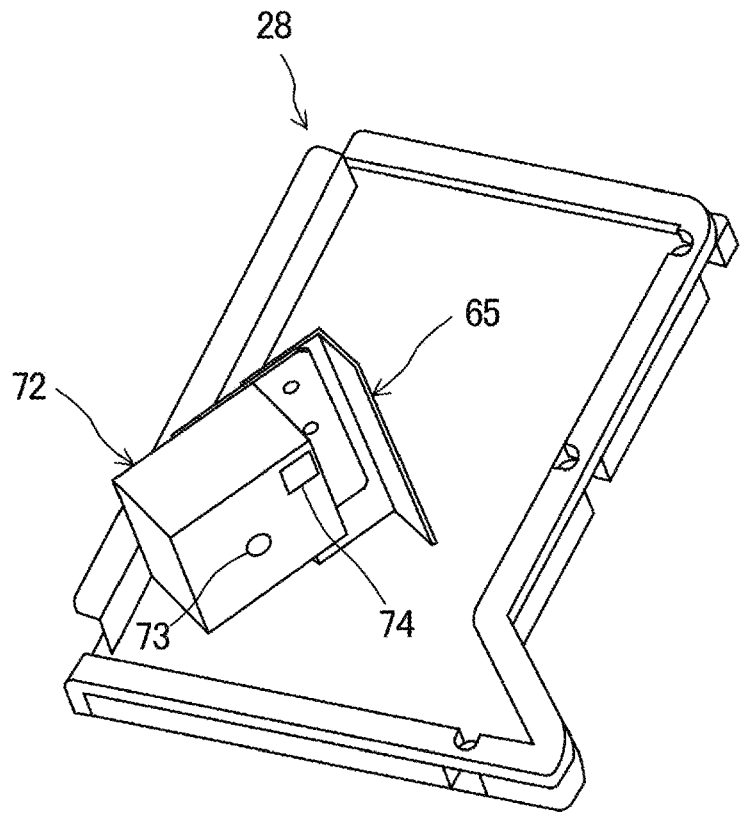
FIG. 5 is a perspective view illustrating an inner structure of an inspection lid.

As illustrated in FIG. 5, a stay (65) is provided on an inner surface of the inspection lid (28). The stay (65) is a support member to which a camera (72) described later is attached, and is fixed to the inspection lid (28). A proximal end of the stay (65) may be fastened to the inner surface of the inspection lid (28) via a fastening member. The camera (72) is detachably attached to the stay (65). Thus, the camera (72) is supported on the inner surface of the inspection lid (28).

When the inspection lid (28) is attached to the inspection port (27), the camera (72) is attached inside the casing (20) of the air conditioner (10) in a state where an imaging direction of the camera (72) faces an imaging target.

Note that the camera (72) may move such that a lens (73) of the camera (72) faces the imaging target.

<Operation of Air Conditioner>

A basic operation of the air conditioner (10) will be described. The air conditioner (10) performs a cooling operation and a heating operation.

In the cooling operation, the refrigerant compressed by the compressor of the outdoor unit radiates heat (is condensed) in the outdoor heat exchanger and is decompressed by the expansion valve. The decompressed refrigerant evaporates in the indoor heat exchanger (43) of the indoor unit (11), and is compressed again by the compressor.

When the fan (40) is operated, the air (RA) is sucked into the air flow path (33) from the suction port (31). The air in the air flow path (33) passes through the indoor heat exchanger (43). In the indoor heat exchanger (43), the refrigerant absorbs heat from the air to cool the air. The cooled air passes through the blow-out port (32) and is then supplied to the indoor space as supply air (SA).

When the air is cooled to a dew point temperature or lower in the indoor heat exchanger (43), moisture in the air is condensed. The condensed water is received by the drain pan (50). The condensed water received by the drain pan (50) is discharged to the outside of the casing (20) by the drain pump (60).

In the heating operation, the refrigerant compressed by the compressor of the outdoor unit radiates heat (is condensed) in the indoor heat exchanger (43) of the indoor unit (11), and is decompressed by the expansion valve. The decompressed refrigerant evaporates in the outdoor heat exchanger of the outdoor unit and is compressed again by the compressor. In the indoor heat exchanger (43), the refrigerant radiates heat to the air and the air is heated.

The heated air passes through the blow-out port (32) and is then supplied to the indoor space as the supply air (SA).

<Configuration of Contamination Information Estimation System>

As described above, during the cooling operation, since the condensed water is accumulated in the drain pan (50), bacteria and mold may occur and grow in the drain pan (50). Thus, in the present embodiment, a contamination information estimation system (70) that estimates contamination such as bacteria and mold on the drain pan (50) is constructed.

Figure 6:
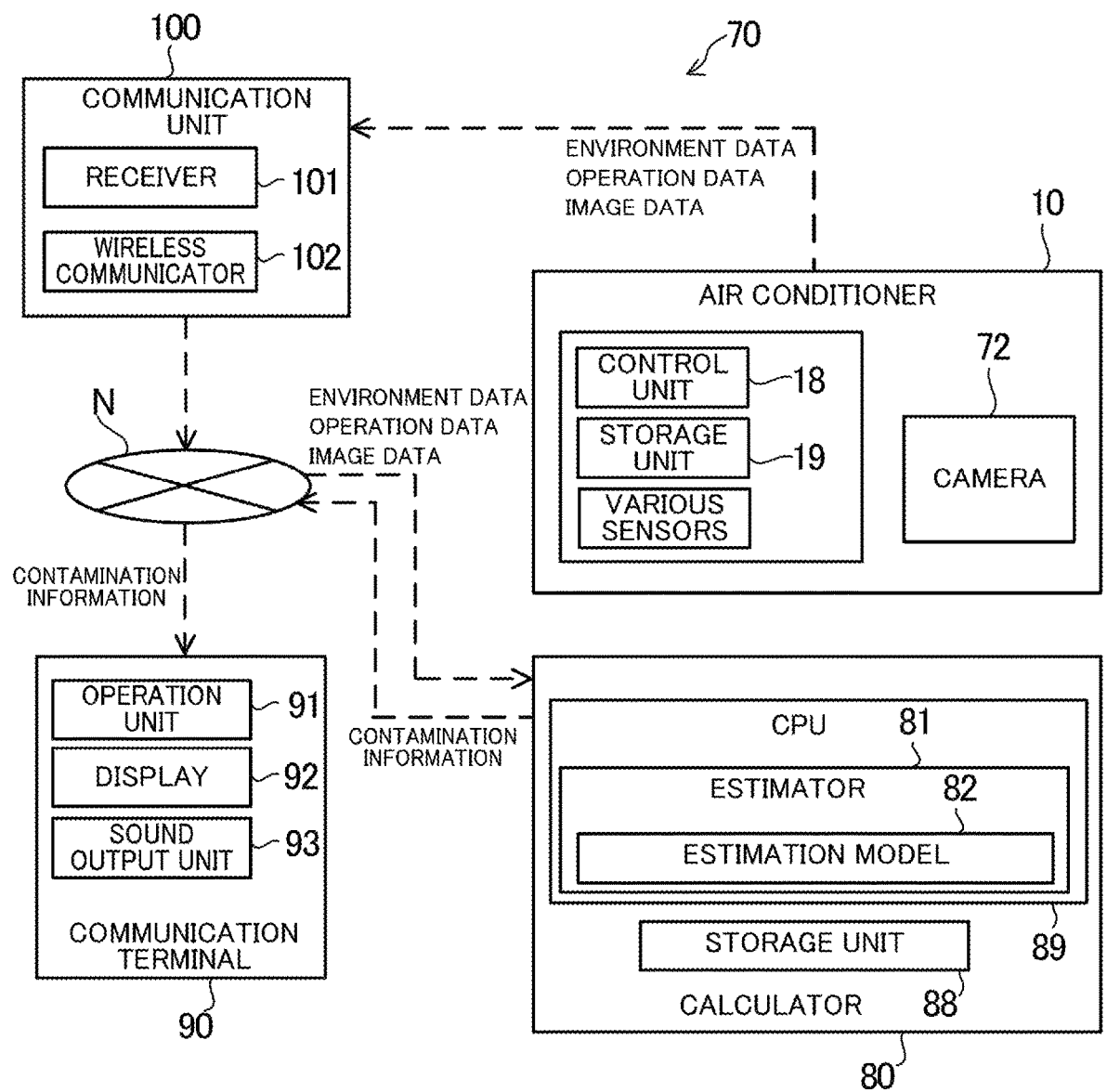
FIG. 6 is a schematic diagram illustrating a configuration of a contamination information estimation system.

The contamination information estimation system (70) in FIG. 6 includes the camera (72), a calculator (80), a communication terminal (90), and a communication unit (100). The camera (72) corresponds to an imaging unit and is located in the air conditioner (10).

The air conditioner (10), the calculator (80), the communication terminal (90), and the communication unit (100) are communicably connected via a network N.

Camera

The camera (72) captures an image of the drain pan (50) as an imaging target, and outputs captured image data.

The camera (72) includes the lens (73) and a light source (74).

As the lens (73), a wide-angle lens, a fisheye lens, or the like is adopted. While the camera (72) is attached to the inner surface of the inspection lid (28), the lens (73) faces inside of the drain pan (50).

While the camera (72) is capturing an image, the light source (74) emits light toward drain pan (50). This is because the inside of the casing (20) is relatively dark, and a certain amount of light is required for imaging.

The camera (72) may capture an image in accordance with an operation of a service provider, or may automatically capture an image every predetermined time. The image data captured by the camera (72) is sequentially transmitted to the calculator (80).

Calculator

The calculator (80) mainly estimates various types of information related to contamination on the drain pan (50). Hereinafter, various types of information related to contamination are referred to as "contamination information".

The calculator (80) is a cloud server configured by a computer including a storage unit (88), a CPU (89), and the like. The storage unit (88) includes a semiconductor memory, an SSD, an HDD, or the like.

The calculator (80) acquires the image data, and operation data and environment data of the air conditioner (10), from the air conditioner (10) via the network N. The image data is data of an image of the drain pan (50) captured by the camera (72). The environment data is data related to the environment in which the air conditioner (10) is provided. The calculator (80) transmits contamination information as an estimation result estimated by the calculator, to the communication terminal (90) via the network N.

Various data acquired by the calculator (80) and the contamination information are stored in the storage unit (88). The contamination information may be transmitted to the communication terminal (90) at a timing of the estimation, or may be transmitted to the communication terminal (90) in response to a transmission request from the communication terminal (90).

In the present embodiment, an example in which the calculator (80) is a device different from the air conditioner (10) is illustrated. The calculator (80) may be incorporated in the air conditioner (10) similarly to the control unit (18).

The CPU (89) of the calculator (80) functions as an estimator (81). The estimator (81) mainly estimates the contamination information on the drain pan (50) on the basis of the image data, the operation data, and the environment data. The estimator (81) includes an estimation model (82).

The estimation model (82) is a dedicated model that obtains the contamination information by calculation. The estimation model (82) is constructed in advance as a multi-level neural network in which a classification capability is acquired by machine learning. The creation and learning of the estimation model (82) will be described in "(Method of creating estimation model)".

(Contents of Contamination Information)

The contamination information includes at least one of the following (a1) to (a6).

(a1) Contamination degree
(a2) Type and amount of contamination
(a3) Location of contamination
(a4) Necessity of maintenance
(a5) Maintenance method if maintenance is necessary
(a6) Timing at which maintenance is to be performed The above (a1) is information indicating what degree of contamination the drain pan (50) currently has. The (a1) may further include what degree of contamination the drain pan (50) may possibly have in the future.

The above (a2) is information indicating what has caused the contamination on the drain pan (50) among oil, mold, bacteria, water stains, and dust.

The above (a3) is information indicating which part of the drain pan (50) has contamination.

The above (a4) is information determined on the basis of a contamination degree of (a1), and is information indicating whether maintenance is necessary. If the contamination degree exceeds a threshold value, the estimator (81) determines that maintenance of the air conditioner (10) is necessary. When the contamination degree is less than or equal to the threshold value, the estimator (81) determines that maintenance of the air conditioner (10) is unnecessary.

The above (a5) is information indicating at least one of a name of a component requiring maintenance, a name of a chemical recommended to be used in maintenance, or a specific process of maintenance. For example, when the contamination on the drain pan (50) is caused by black mold, use of a chemical containing hypochlorite is recommended for maintenance of the drain pan (50). When the contamination on the drain pan (50) is caused by contamination on the indoor heat exchanger (43), the drain pan (50) and the indoor heat exchanger (43) are subjected to maintenance.

The above (a6) is information indicating a timing at which maintenance of the air conditioner (10) is recommended by a time or a length of time from the present. For example, the above timing represents maintenance as "now", "around June 2020", or "after three months".

(Contents of Operation Data)

Contents of the operation data used for an estimation operation will be specifically described below.

The operation data includes at least one of the following (b1) to (b10).

(b1) Operating Time of Air Conditioner (10)

During the cooling operation, condensed water generated in the indoor heat exchanger (43) is stored in the drain pan (50). When the air conditioner (10) stops operating in this state, the condensed water starts to evaporate. Then, the humidity in the casing (20) increases, and the inside of the casing (20) becomes an environment in which mold and bacteria easily propagate. The estimator (81) can recognize a storage amount of the condensed water by using the operating time of the air conditioner (10) as the operation data for the estimation operation. The above (b1) is useful for recognition of an amount of mold and bacteria in (a2) and estimation of (a1).

(b2) Time in which Inside of Casing (20) has been Cleaned

The estimator (81) can determine a cause of removal of contamination before the cleaning by recognizing a time in which the inside of the casing (20) has been cleaned. The cause includes natural removal of the contamination by a flow of air and/or condensed water passing through the inside of the casing (20), and removal of the contamination by cleaning.

The estimator (81) can recognize presence of contamination that can be removed by cleaning and contamination that cannot be removed by cleaning in accordance with the time in which the inside of the casing (20) has been cleaned. This is useful for estimation of (a4). The estimator (81) can recognize what degree of contamination the casing (20) has had when the casing (20) has been cleaned in accordance with the time in which the inside of the casing (20) has been cleaned. This is useful for estimating (a6).

(b3) Number of Rotations and Current Value of Drain Pump (60)

A number of rotations of the drain pump (60) is a number of rotations of a motor that drives the drain pump (60). A current value of the drain pump (60) is a value of a current flowing through the motor. A load applied to the motor changes depending on the amount of the condensed water in the drain pan (50) sucked up by the drain pump (60), a viscosity of the sucked condensed water, and the like. The number of rotations and the current value of the drain pump (60) change depending on the load.

Thus, the estimator (81) can determine the amount and viscosity of the condensed water in the drain pan (50), presence or absence of waste and biofilms mixed in the condensed water, and the like by using the number of rotations and the current value of drain pump (60) as the operation data for the estimation operation. This determination improves accuracy of the estimation of (a1) to (a6).

(b4) Temperature and Humidity of Air (RA) Detected by Suction Air Sensor

The temperature and humidity of the air (RA) can be approximated by a temperature and humidity in the casing (20). A growth amount of bacteria and mold varies depending on the temperature and humidity in the casing (20). Since the temperature and humidity of the air (RA) sucked into the casing (20) are used for the estimation operation as the operation data, estimation accuracy of a growth state of mold and bacteria in (a2) and estimation accuracy of (a1) are improved.

On the basis of a strict difference between the temperature and humidity of the air (RA) and the temperature and humidity in the casing (20), the estimator (81) can recognize a workload of the indoor unit (11). On the basis of the workload, the estimator (81) can estimate the contamination degree of not only the drain pan (50) but also the indoor heat exchanger (43) or the like. The workload is also useful for recognizing an amount of condensed water generated in the indoor heat exchanger (43).

(b5) Temperature of Indoor Heat Exchanger (43) Detected by Heat Exchange Sensor An influence of the temperature and humidity of the air on bacteria and mold is significant. In order to recognize a growth status of bacteria and mold, it is desirable to accurately recognize a state of the air around the drain pan (50). The estimator (81) can more accurately recognize the state of the air around the drain pan (50) by using the temperature of the indoor heat exchanger (43) as the operation data for the estimation operation. Thus, the temperature of the indoor heat exchanger (43) is useful for estimating the contamination information of (a1) to (a6).

When the filter near the suction port (31) is clogged or the indoor heat exchanger (43) has contamination, the volume of the air (RA) sucked into the casing (20) may decrease and an airflow speed may be deviated. This phenomenon reduces performance of the indoor heat exchanger (43) and causes a decrease in the temperature of the indoor heat exchanger (43) during the cooling operation and a rise in the temperature of the indoor heat exchanger (43) during the heating operation. Thus, the temperature of the indoor heat exchanger (43) is useful for recognizing the contamination degree of not only the drain pan (50) but also the indoor heat exchanger (43) and a state of the clogging of the filter.

The clogging of the filter may cause stagnation of the air flow in the casing (20) and may cause a growth of mold and bacteria in the drain pan (50). Thus, recognizing the clogging of the filter is also useful for estimating the contamination information of (a1) to (a6) of the drain pan (50).

By using the temperature and humidity of the air (RA) in addition to the temperature of the indoor heat exchanger (43) as the operation data, the estimator (81) can recognize the amount of the condensed water generated in the indoor heat exchanger (43). The estimator (81) can recognize presence or absence of abnormality of the drain pump (60) as accurately as possible by recognizing the amount of the generated condensed water and an amount of the condensed water sucked up and discharged by the drain pump (60). The recognition of the presence or absence of abnormality of the drain pump (60) is useful for the estimation of (a1) to (a6) of the drain pan (50).

(b6) Volume of Air (SA) Blown Out from Blow-Out Port (32)

There is unevenness in distribution of the temperature and humidity in the casing (20). The estimator (81) can recognize each distribution of the temperature and the humidity in the casing (20) as accurately as possible by using the volume of the air (SA) as the operation data for the estimation operation. This recognition is useful for the estimation of (a1) to (a6) of the drain pan (50).

The growth amount of bacteria and mold is related to an amount of particulate flowing into the casing (20), or the like. By using the volume of the air (SA) as the operation data for the estimation operation, the estimator (81) can recognize an inflow amount of the particulate to some extent and recognize the growth amount of bacteria and mold.

(b7) Control Parameters Used to Drive Fan (40)

Control parameters used to drive the fan (40) include the value of the current flowing through the motor (42) of the fan (40) and a number of rotations of the fan (40).

The clogging of the filter located near the suction port (31) increases a pressure loss in the casing (20). The increase in the pressure loss increases the value of the current flowing through the motor (42) of the fan (40). Thus, the estimator (81) can recognize the clogging of the filter and the like from the current value. The recognition of the clogging of the filter is also useful for estimating the contamination information of (a1) to (a6) of the drain pan (50).

(b8) Liquid Pipe Temperature and/or Gas Pipe Temperature Detected by Pipe Temperature Sensor The temperature of the indoor heat exchanger (43) may not be uniform. The estimator (81) can recognize the distribution of the temperature in the indoor heat exchanger (43) as accurately as possible by using a liquid pipe temperature and/or a gas pipe temperature as the operation data for the estimation operation. This recognition also helps to recognize the state of the air in the casing (20) more accurately.

As described above, the contamination of the indoor heat exchanger (43), a decrease in the volume of the air (RA), a deviation in the airflow speed, and the like deteriorate the performance of the indoor heat exchanger (43). A decrease in the performance of the indoor heat exchanger (43) causes changes in the liquid pipe temperature and the gas pipe temperature. The estimator (81) can recognize the volume of the air (RA), an airflow speed distribution of the air (RA), a state of the indoor heat exchanger (43), and the like by using the liquid pipe temperature or the gas pipe temperature as the operation data for the estimation operation. Such recognition is useful for improving the accuracy of (a1) to (a6) of the drain pan (50).

Furthermore, the growth state of bacteria also changes depending on a degree of dew condensation on the liquid pipe. The use of the liquid pipe temperature as the operation data for the estimation operation helps estimation of the contamination information in the casing (20) including the drain pan (50).

(b9) Water Level and Temperature in Drain Pan (50) Detected by Drain Pan Sensor A growth rate of bacteria depends on water temperature. The estimator (81) can estimate the growth state of bacteria as accurately as possible by using the temperature of the condensed water in the drain pan (50) as the operation data for the estimation operation. This estimation is useful for estimation of (a2).

A type of bacteria likely to grow varies depending on the water temperature. The estimator (81) can easily estimate the type of bacteria of (a2) by using the temperature of the condensed water in the drain pan (50) as the operation data for the estimation operation.

When the drain pump (60) is clogged, the condensed water is less likely to be discharged from the drain pan (50), and the water level in the drain pan (50) rises. The estimator (81) can recognize the degree of clogging of the drain pump (60) by using the water level of the drain pan (50) as the operation data for the estimation operation. The degree of clogging of the drain pump (60) is useful for the estimation of (a1) to (a6).

(b10) Presence or Absence of Operating Mode in which Bacteria May Grow

Bacteria, one of the major sources of contamination of the drain pan (50), grow in the condensed water. While the condensed water continues to be discharged from the drain pan (50) to the outside of the casing (20), the bacteria are discharged to the outside of the casing (20) together with the condensed water. The temperature of the condensed water newly flowing into the drain pan (50) is relatively low. Thus, while the condensed water is continuously discharged from the drain pan (50) to the outside of the casing (20), the growth of bacteria is suppressed.

When the air conditioner (10) is not operating or is operating without generating condensed water, and the temperature in the casing (20) rises, a growth of bacteria is expected. Thus, using the presence or absence of the operating mode in which bacteria may grow as the operation data for the estimation operation is useful for the estimation of (b1) to (b6).

The operating mode in which bacteria may grow refers to a mode in which condensed water continues to be accumulated in the drain pan (50) for a predetermined time or more and no new condensed water is supplied to the drain pan (50). The predetermined time is set to a relatively long time. The following (I) to (IV) correspond to operating modes in which bacteria may grow.

(I) A case where the air conditioner (10) stops operating when condensed water is generated from the indoor heat exchanger (43) during the cooling operation.

(II) A case where the air conditioner (10) continues to perform a thermo-off operation due to a decrease in a load in the room or a change in a set temperature when condensed water is generated from the indoor heat exchanger (43) during the cooling operation.

(III) A case where the humidity in the room decreases when condensed water is generated from the indoor heat exchanger (43) during the cooling operation, and as a result, the generation of the condensed water stops.

(IV) A case where the temperature of the indoor heat exchanger (43) rises due to a change in the set temperature during the cooling operation when condensed water is generated from the indoor heat exchanger (43), and as a result, the generation of the condensed water stops.

The "thermo-off" in (II) refers to an operation of stopping the inflow of the refrigerant into the indoor heat exchanger (43) and stopping the cooling of the air in the indoor heat exchanger (43) by the refrigerant. The time during which the thermo-off operation continues can also be used for the estimation operation as the operation data.

(Contents of Environment Data)

Contents of the environment data used for the estimation operation will be specifically described below.

The environment data includes at least one of the following (c1) and (c2).

(c1) Air Quality Detected by Air Quality Sensor

The air quality includes VOC such as oil mist and particulate contained in the air.

VOC such as oil mist and the amount of particulate will be nutrients of bacteria and mold. The use of the air quality of the sucked air (RA) for the estimation operation as the environment data is useful for the estimation of the growth status of bacteria and mold in (a2) and the estimation of (a1).

The quality of the air sucked into the casing (20) varies depending on a degree of clogging of the filter near the suction port (31). The use of the air quality as the environment data in the estimation operation is useful for estimating not only the contamination information of the drain pan (50) but also the degree of clogging of the filter.

The amount of VOC and particulate sucked into the casing (20) increase as the operating time of the air conditioner (10) increases. By using both the operation data of (b1) and the environment data of (c1) for the estimation operation, the estimator (81) can estimate the contamination degree of not only the drain pan (50) but also the filter and the indoor heat exchanger (43).

(c2) Installation Location of Air Conditioner (10) Stored in Storage Unit (19)

A state of contamination of the indoor unit (11) varies depending on an environment in which the air conditioner (10) is installed. For example, when the air conditioner (10) is installed in a barbecue restaurant, a large amount of smoke and oil is sucked into the casing (20). Oil is likely to adhere to the filter and the indoor heat exchanger (43), and bacteria and mold caused by the adhering oil are likely to be generated. When the installation location of the air conditioner (10) is a hair salon, a chemical having relatively high volatility such as permanent wave solution is sucked into the casing (20). In this case, bacteria and mold are also likely to be generated.

By using the installation location of the air conditioner (10) as the environment data for the estimation operation, the estimator (81) can easily estimate (b2) and easily identify presence or absence and a cause of clogging of the filter or the like.

(Image Data)

A number of pieces of image data used for the estimation operation by the estimator (81) may be one or plural.

In a case where the camera (72) automatically captures an image every predetermined time, the estimator (81) uses a plurality of image data captured every predetermined time for estimating the contamination information. In other words, the estimator (81) uses the plurality of image data obtained by capturing images of the drain pan a plurality of times by the camera (72) with a lapse of time for estimating the contamination information. By using the image data captured periodically, the estimator (81) can recognize a transition of a change in the contamination per predetermined time. This recognition improves the accuracy of estimation of the contamination information.

(Creation and Learning Method of Estimation Model)

Creation and a learning method of the estimation model (82) used in the estimation operation by the estimator (81) will be described.

Machine learning used to create a neural network as the estimation model (82) includes deep learning and the like.

There are two types of learning methods, which are supervised learning and unsupervised learning.

Supervised Learning

In the supervised learning, the neural network of the estimation model (82) learns using learning data and a discriminant function. The learning data is a set of pairs of input data and teaching data corresponding to the input data. The teaching data is, for example, a parameter related to identification, classification, and evaluation of the input data. By repeating this learning, the parameter of the neural network is appropriately updated. As a result, the estimation model (82) becomes a model capable of estimating the contamination information with higher accuracy.

For example, a large amount of image data of the drain pan (50) is prepared as the input data, and a label for each piece of image data is prepared as the teaching data. The label indicates the contamination degree of the drain pan (50). The estimation model (82) is created and updated by causing the neural network to learn using the image data and the label.

In the creation and update of the neural network by the supervised learning, not only the image data but also the operation data and the environment data are used as the input data.

The label may be created by a constructor of the contamination information estimation system (70), or may be automatically created by AI or an image processing program. The label automatically created by the AI or the image processing program may be visually recognized by the constructor of the contamination information estimation system (70).

Note that a plurality of labels may be given to one piece of image data, or location information of the contamination in the image data may be given to the label.

The image data used for learning may be image data rotated, enlarged, or reduced. The image data used for learning may be image data on which noise is intentionally added, image data created by another AI, or image data in which these are combined.

Unsupervised Learning

In the unsupervised learning, a label indicating which classification each of the plurality of input data belongs to is not given in advance. By clustering, the neural network is created and updated by repeating a learning operation of grouping a plurality of input data into a plurality of classifications such that input data similar to each other have the same classification.

For example, the operation data and the environment data of the air conditioner (10) are prepared as the input data, and each data is classified. The classified operation data and environment data can be used as the learning data, and a set (cluster) of classified data can be used as the estimation model (82).

In the creation and update of the neural network by the unsupervised learning, not only the operation data and the environment data but also the image data are used as the learning data.

When an estimation result using the created estimation model (82) deviates from actual contamination information of the drain pan (50), it is assumed that the accuracy of the estimation model (82) is relatively low. In this case, the constructor of the system may give the label to various data used in the estimation with low accuracy. The label is created so as to represent the actual contamination information of the drain pan (50). The accuracy of the estimation model (82) can be further improved by updating the estimation model (82) using this label and various data corresponding to the label.

Communication Unit

The communication unit (100) is an adapter for connecting the air conditioner (10) to the network N, and includes a receiver (101) and a wireless communicator (102). The receiver (101) is a communication interface with the air conditioner (10), and receives the image data, and the environment data and the operation data of the air conditioner (10) from the air conditioner (10). The wireless communicator (102) wirelessly transmits the environment data, the operation data, and the image data received by the receiver (101) to the network N.

Communication Terminal

The communication terminal (90) includes a smartphone, a tablet terminal, a mobile phone, a personal computer, or the like. The communication terminal (90) includes an operation unit (91), a display (92), and a sound output unit (93).

The operation unit (91) includes a keyboard, a touch panel, and the like. The service provider or the like operates predetermined application software by operating the operation unit (91). With this application, the service provider or the like can cause the camera (72) to capture an image or download the captured image data to the communication terminal (90).

The display (92) includes, for example, a liquid crystal monitor. The display (92) displays the image data captured by the camera (72) and the contamination information. The service provider can visually recognize at least one of (a1) to (a6).

The sound output unit (93) includes a speaker. The contamination information is output by sound from the sound output unit (93). The service provider can hear at least one of (a1) to (a6).

<Operations of Contamination Information Estimation System>

Figure 7:
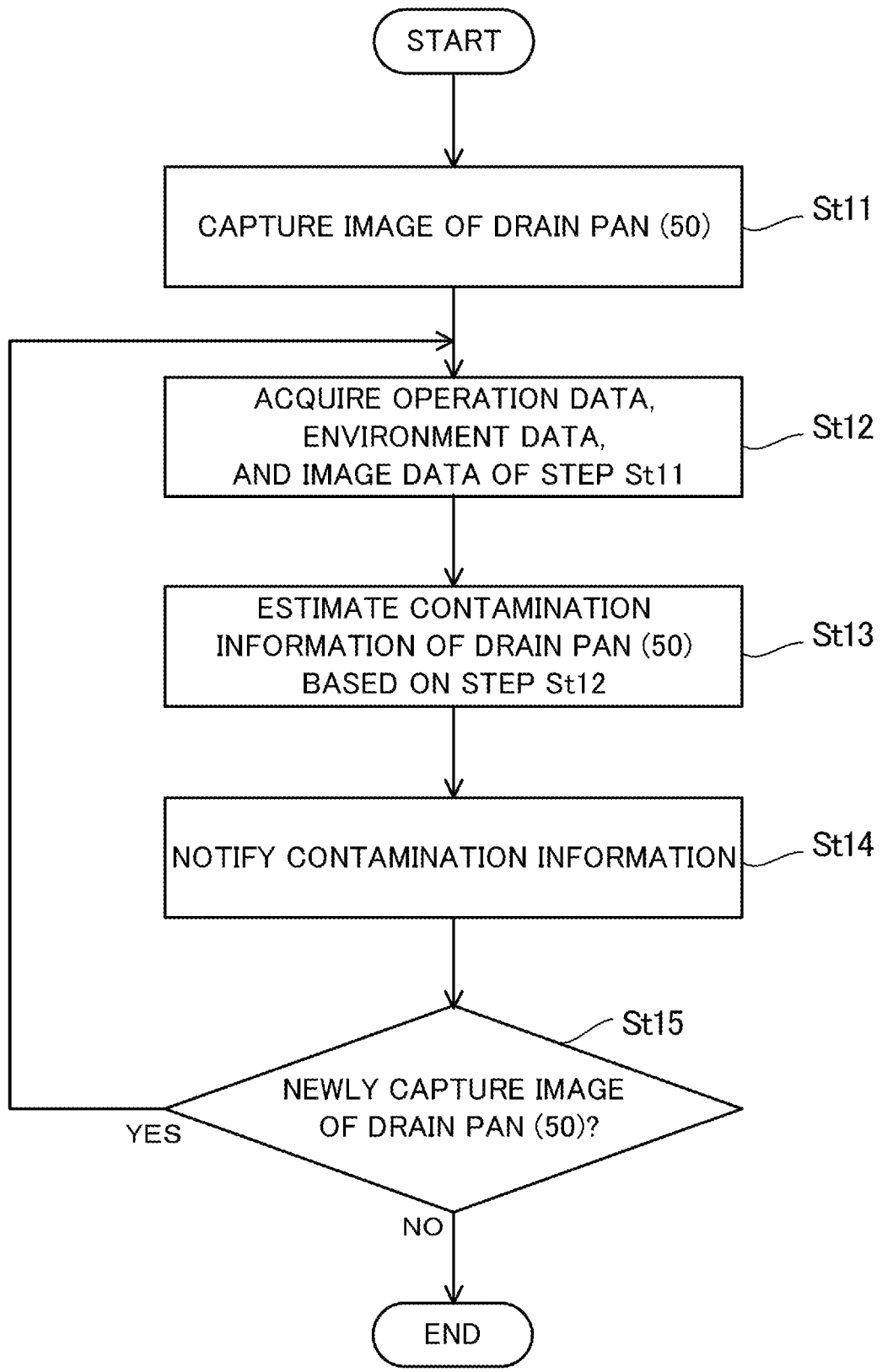
FIG. 7 is a flowchart of an operation of the contamination information estimation system.

FIG. 7 illustrates operations of the contamination information estimation system (70).

When the camera (72) captures an image of the drain pan (50) (step St11), the calculator (80) acquires the image data captured in step St11. The calculator (80) acquires the operation data and the environment data from the control unit (18), the storage unit (19), and various sensors in the air conditioner (10) via the network N (step St12).

The operation data acquired by the calculator (80) in step St12 includes past operation data of the air conditioner (10) in addition to the current operation data of the air conditioner (10). As the operation data, at least one of (b1) to (b10) is used. As the environment data, at least one of (c1) or (c2) is used.

The estimator (81) of the calculator (80) inputs the image data, the operation data, and the environment data acquired in step St12 to the estimation model (82). The estimator (81) mainly estimates the contamination information of the drain pan (50) using the estimation model (82) (step St13).

The contamination information in step St13 includes at least one of (a1) to (a6). The calculator (80) transmits the contamination information in step St13 to the communication terminal (90).

The communication terminal (90) outputs the contamination information in step St13 to the display (92) and the sound output unit (93). The display (92) and the sound output unit (93) notify the contamination information (step St14). As a result, a user such as the service provider can recognize the contamination information of the drain pan (50) and cleaning of the drain pan (50) or the like is performed as necessary.

After step St14, when the camera (72) newly captures an image of the drain pan (50) (Yes in step St15), the operations of step St12 and the subsequent steps are repeated.

Effects

The camera (72) captures an image of the drain pan (50) as one of the components of the air conditioner (10). The estimator (81) mainly estimates the contamination information of the drain pan (50) by using the operation data and the environment data of the air conditioner (10) in addition to the image data of the drain pan (50). As a result, estimation accuracy of the contamination information is improved.

The estimator (81) uses the plurality of image data obtained by capturing images of the drain pan (50) a plurality of times by the camera (72) with a lapse of time for estimating the contamination information. Since the estimator (81) can therefore recognize a transition of the contamination of the drain pan (50), the estimation accuracy of the contamination information can be more easily improved.

An air quality may affect a growth amount of bacteria and mold. Since the data related to the air quality is used as the environment data for estimating the contamination information, and the estimation accuracy of the contamination information is easily improved.

The installation location of the air conditioner (10) may affect the state of contamination of the drain pan (50), the degree of contamination, and the like. Since the data related to the installation location is used as the environment data for estimating the contamination information, the estimation accuracy of the contamination information is easily improved.

The temperature of the indoor heat exchanger (43) may affect not only bacteria and mold but also a state of the indoor heat exchanger (43) or the components around the indoor heat exchanger (43). The control parameter used to drive the fan (40) is useful for, for example, recognizing a state of a component around the fan (40). A time period during which the inflow of the refrigerant into the indoor heat exchanger (43) is stopped, the number of rotations of the drain pump (60), and the operating time of the air conditioner (10) are also useful for recognizing the state in the casing (20). Since at least one of these pieces of information is used to estimate the contamination information as the operation data, the estimation accuracy of the contamination information is easily improved.

The contamination information includes at least one of the degree of contamination of the drain pan (50), a type of the contamination, a location of the contamination, necessity of maintenance, or a time when maintenance is to be performed. This contamination information is notified by the display (92) and the sound output unit (93). The user such as a service provider can know the contamination information described above.

Modification

Figure 8:
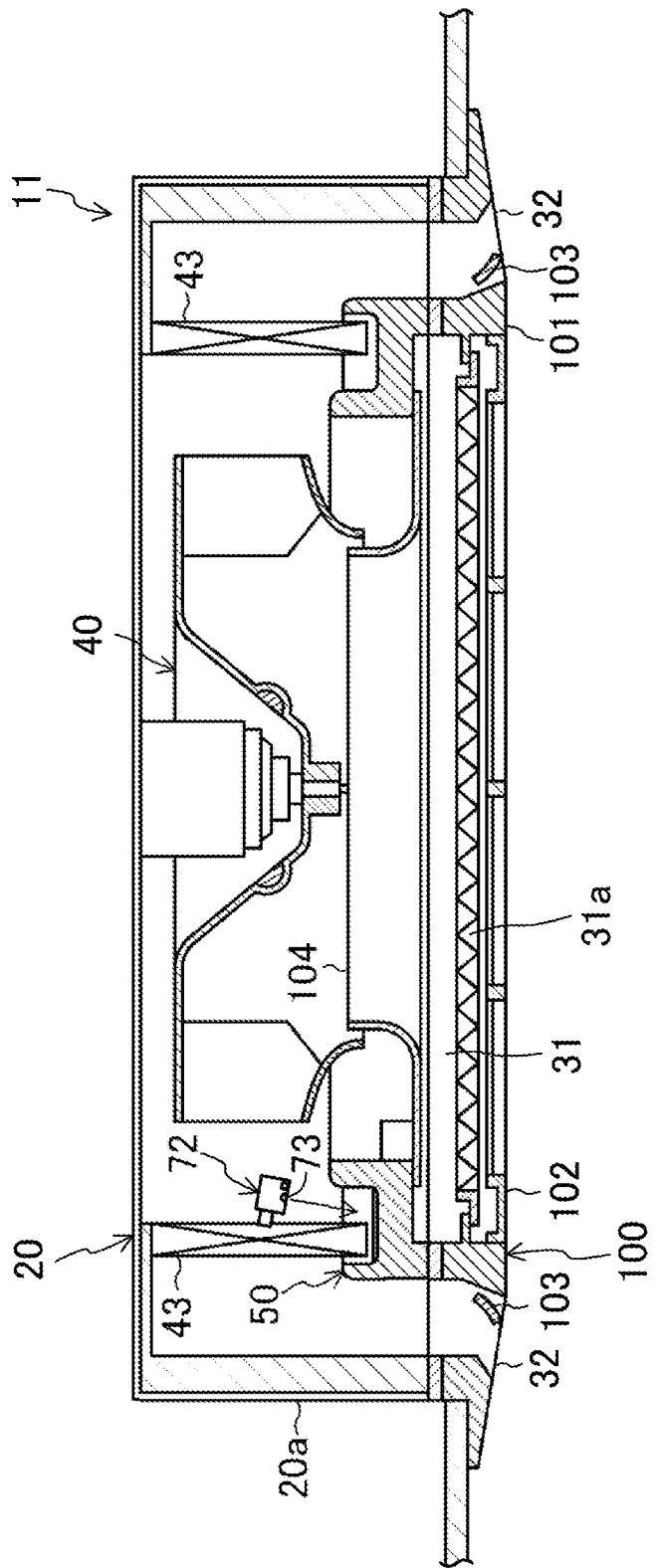
FIG. 8 is a longitudinal sectional view illustrating an internal structure of an air conditioner according to a modification.

As illustrated in FIG. 8, the contamination information estimation system (70) can also be applied to a ceiling-suspended or ceiling-embedded air conditioner (10).

The air conditioner (10) in FIG. 8 includes the outdoor unit (not shown) and the indoor unit (11), and these units are connected by the refrigerant pipe to constitute the refrigerant circuit.

The indoor unit (11) includes the casing (20) installed in the attic. The casing (20) includes a casing body (20a) and a panel (100). The casing body (20a) has a rectangular box shape with an opening surface formed on a lower side. The panel (100) is detachably provided on an opening surface of the casing body (20a). The panel (100) includes a rectangular frame-shaped panel body (101) and a suction grill (102) provided at a center of the panel body (101).

One suction port (31) is formed at the center of the panel body (101). A filter (31a) is provided so as to cover the suction port (31). The suction grill (102) is attached to the suction port (31) below the filter (31a). One blow-out port (32) is formed at each of four side edges of the panel body (101). The blow-out ports (32) extend along the four side edges. A flap (103) that changes an air direction is provided in each blow-out port (32).

A bell mouth (104), the fan (40), the indoor heat exchanger (43), and the drain pan (50) are provided in the casing body (20a). The bell mouth (104) and the fan (40) are disposed above the suction grill (102). The indoor heat exchanger (43) is disposed so as to surround the fan (40). The indoor heat exchanger (43) includes a fin-and-tube heat exchanger. The drain pan (50) is disposed below the indoor heat exchanger (43).

The lens (73) of the camera (72) faces a bottom surface of the drain pan (50). The camera (72) captures an image of at least the bottom surface of the drain pan (50).

In the air conditioner (10) in FIG. 8, the contamination information estimation system (70) in FIG. 6 also estimates the contamination information related to the contamination of the drain pan (50).

In the air conditioner (10) in FIG. 8, the contents of the operation data used for the estimation operation of the contamination information include the following (b11) in addition to (b1) to (17010).

(b11) Angle of Flap (103)

An angle of the flaps (103) changes the volume of the air in the casing (20). The estimator (81) can recognize the state of the air in the casing (20) as accurately as possible by using the angle of the flap (103) as the operation data for the estimation operation.

When the angle of the flap (103) is changed, a flow of air into the room also changes, and a flow of air sucked into the indoor unit (11) also changes. By using the angle of the flap (103) as learning data, the estimator (81) can learn an angle of the flap (103) into which the particulate and VOC are likely to be sucked. In other words, the angle of the flap (103) also serves as data for updating the estimation model (82).

When moist air is in contact with the flap (103), mold may be generated on the flap (103). The estimator (81) can estimate the contamination of not only the drain pan (50) but also the flap (103) by using the angle of the flap (103) as the operation data for the estimation operation.

In the air conditioner (10) in FIG. 8, the contents of the environment data used for the contamination information estimation operation and the contents of the contamination information are similar to those described above. A notification operation of the contamination information is similar to the above.

Other Embodiments

An estimation target of the contamination information is not limited to the drain pan (50). The components other than the drain pan (50), such as the fan (40), the indoor heat exchanger (43), the air filter, the inner wall of the duct, and an inner wall of a water flow path, may be the estimation targets. The water flow path includes the suction portion (61) of the drain pump (60) and the discharge pipe (63) of the drain pump (60).

The camera (72) may further include an LED for emitting visible light in addition to the light source (74) for firing a flash. In the estimation of the contamination information, when the estimator (81) detects bacteria growing, the LED emits visible light toward the drain pan (50). As a result, radicals are generated in the condensed water in the drain pan (50), and a degree of the growth of bacteria is reduced.

The contamination information estimation system (70) may be incorporated in the air conditioner (10).

The tray as an imaging target may be a component other than the drain pan (50) as long as the tray receives water. The tray may be a water receiver installed below a humidifier tank. The water receiver is supplied with water in the humidifier tank. The water in the water receiver is used to humidify the air. The humidifier tank and the water receiver are placed in, for example, an air purifier or a humidity controller.

The imaging unit is not limited to the camera, and may be, for example, an optical sensor.

The light source (74) of the camera (72) may be separate from a camera body.

The imaging unit may be disposed in a casing of the outdoor unit.

The air treatment device may be another device as long as the air treatment device has a casing through which air flows. The air treatment device may be a humidity controller, a ventilator, or an air purifier. The humidity controller adjusts the humidity of the air in a target space. The ventilator ventilates the target space. The air purifier purifies the air in the target space.

The humidity controller and the air purifier include, as components, a humidifier tank and a water receiver installed below the humidifier tank. In the humidity controller and the air purifier, these components are the imaging targets, and the estimator may estimate the contamination information related to the components. The ventilator ventilates the target space. The ventilator includes, as a component, a total heat exchanger. In the ventilator, the total heat exchanger may be the imaging target, and the estimator may estimate the contamination information related to the total heat exchanger.

For example, the air conditioner may be an outside air treatment system that adjusts the temperature and humidity of outdoor air that has been taken in. The air conditioner includes a humidifier that humidifies the air. The humidifier includes a plurality of water absorbing members. In this case, a tray that receives water flowing out of the humidifier is disposed below the humidifier. The imaging unit images the tray, and the estimator estimates contamination information related to the tray.

Depending on a type of the air treatment device, an axial fan may be employed. Also in this case, the contents of the operation data used for the estimation operation of the contamination information include (b1) to (b10). In the axial fan, when the pressure loss becomes relatively large or the number of rotations of the fan becomes relatively high, a flow of the air in a centrifugal direction of the axial fan increases. Thus, the estimator (81) can more accurately recognize the state of the air in the casing by using (b7) as the operation data for the estimation operation.

When the value of the current flowing through the motor (42) of the fan (40) is used as the learning data during learning of the estimation model (82), the estimation accuracy of the estimation model (82) is improved as compared with when the number of rotations of the fan (40) is used as the learning data.

When estimating the contamination information related to the drain pan (50) using the estimation model (82), the estimator (81) may compare the previously estimated contamination information with the newly estimated contamination information. From a comparison result, the estimator (81) can recognize a change amount in contamination adhesion. This change amount can be used for further learning of the estimation model (82), and the estimation accuracy of the estimation model (82) is further improved.

The image data used for estimation may be moving image data instead of still image data.

When an entire image of the drain pan (50) does not fall within one image, the camera (72) may capture images of the drain pan (50) a plurality of times by changing a position of the camera body or a position of the lens (73). In this case, image data captured a plurality of times is used for the estimation operation of the contamination information.

The notification of the contamination information is not necessary. When the contamination information is notified, a notification method may be only by display or only by sound output.

Any one of the operation data or the environment data and the image data may be used for the estimation operation of the contamination information. In other words, examples of a combination of data used for the estimation operation of the contamination information include three types which are the operation data and image data, the environment data and image data, and the operation data, environment data, and image data.

The embodiment and the modification have been described above. Various modifications to modes and details will be apparently available without departing from the object and the scope of the claims. The embodiment and the modification may be combined or replaced appropriately unless affecting the functions of the present disclosure.

INDUSTRIAL APPLICABILITY

As described above, the present disclosure is useful as a contamination information estimation system and an air treatment device.

REFERENCE SIGNS LIST

70: contamination information estimation system
72: camera (imaging unit)
81: estimator
92: display (notifier)
93: sound output unit (notifier)
103: flap

The invention claimed is:

1. A contamination information estimation system comprising:
an imager configured to capture an image of a suction portion of a drain pump or a discharge pipe of the drain pump in a casing of an air treatment device;
a processor configured to estimate contamination information on the suction portion of the drain pump or the discharge pipe of the drain pump based on an estimation model created by machine learning using, as input data, image data captured by the imager and operation data of the air treatment device and/or environment data related to an environment in which the air treatment device is provided; and
a notifier configured to output the contamination information as a notification to a service provider, wherein the notification enables the suction portion of the drain pump or the discharge pipe of the drain pump in the casing to be cleaned based on the outputted contamination information.

2. The contamination information estimation system according to claim 1, wherein the processor uses, for estimation of the contamination information, a plurality of the image data obtained by the imager capturing images of the suction portion of the drain pump or the discharge pipe of the drain pump a plurality of times with a lapse of time.

3. The contamination information estimation system according to claim 1, wherein the environment data includes data related to a quality of air sucked into the casing.

4. The contamination information estimation system according to claim 1, wherein the environment data includes data related to an installation location of the air treatment device.

5. The contamination information estimation system according to claim 1, wherein the contamination information includes at least one of a degree of the contamination on the suction portion of the drain pump or the discharge pipe of the drain pump, a type of the contamination on the suction portion of the drain pump or the discharge pipe of the drain pump, a location of the contamination on the suction portion of the drain pump or the discharge pipe of the drain pump, necessity of maintenance of the suction portion of the drain pump or the discharge pipe of the drain pump, or a time for the suction portion of the drain pump or the discharge pipe of the drain pump to be subjected to maintenance.

6. An air treatment device that incorporates the contamination information estimation system described in claim 1.

7. A contamination information estimation system comprising:
an imager configured to capture an image of a drain pan, a suction portion of a drain pump, or a discharge pipe of the drain pump in a casing of an air treatment device;
a processor configured to estimate contamination information on the drain pan, the suction portion of the drain pump, or the discharge pipe of the drain pump based on an estimation model created by machine learning using, as input data, image data captured by the imager, operation data of the air treatment device, and environment data related to an environment in which the air treatment device is provided; and
a notifier configured to output the contamination information as a notification to a service provider, wherein the notification enables the drain pan, the suction portion of the drain pump, or the discharge pipe of the drain pump in the casing to be cleaned based on the outputted contamination information,
wherein the operation data includes at least one of a temperature of a heat exchanger included in the casing, a control parameter used to drive a fan included in the casing, an angle of a flap provided in the casing, a time period during which an inflow of a refrigerant into the heat exchanger is stopped, or a number of rotations of the drain pump included in the casing.

8. A contamination information estimation system comprising:
an imager configured to capture an image of a drain pan, a suction portion of a drain pump, or a discharge pipe of the drain pump in a casing of an air treatment device;
a processor configured to estimate contamination information on the drain pan, the suction portion of the drain pump, or the discharge pipe of the drain pump based on an estimation model created by machine learning using, as input data, image data captured by the imager and operation data of the air treatment device; and a notifier configured to output the contamination information as a notification to a service provider, wherein the notification enables the drain pan, the suction portion of the drain pump, or the discharge pipe of the drain pump in the casing to be cleaned based on the outputted contamination information, wherein the operation data includes at least one of a temperature of a heat exchanger included in the casing, a control parameter used to drive a fan included in the casing, an angle of a flap provided in the casing, a time period during which an inflow of a refrigerant into the heat exchanger is stopped, or a number of rotations of the drain pump included in the casing.

* * * * *

UNITED STATES PATENT AND TRADEMARK OFFICE
CERTIFICATE OF CORRECTION

PATENT NO. : 12,152,799 B2  
APPLICATION NO. : 17/459811  
DATED : November 26, 2024  
INVENTOR(S) : Keita Kitagawa et al.

Page 1 of 1

It is certified that error appears in the above-identified patent and that said Letters Patent is hereby corrected as shown below:

On the Title Page

<u>On page 2, Line 8:</u>  
Item (56), References Cited  
FOREIGN PATENT DOCUMENTS  
Please change:  
"FR 3 985 789 A1 11/2018"  
To:  
--FR 3 065 789 A1 11/2018--

Signed and Sealed this  
Eleventh Day of February, 2025

Coke Morgan Stewart  
*Acting Director of the United States Patent and Trademark Office*